United States Patent [19]

Cencula

[11] Patent Number: 5,305,793
[45] Date of Patent: Apr. 26, 1994

[54] AUTOMATIC PRESSURIZED RESERVOIR BLEED VALVE

[75] Inventor: Michael A. Cencula, Clearwater, Fla.

[73] Assignee: Pall Corporation, East Hills, N.Y.

[21] Appl. No.: 945,367

[22] Filed: Sep. 16, 1992

[51] Int. Cl.[5] .............................................. F16K 24/00
[52] U.S. Cl. ...................................... 137/198; 137/199
[58] Field of Search ................................ 137/198, 199

[56] References Cited

U.S. PATENT DOCUMENTS

| | | |
|---|---|---|
| 1,873,396 | 8/1932 | Hallenbeck . |
| 1,947,586 | 2/1934 | Fletcher ............................ 137/75 |
| 2,362,724 | 11/1944 | Shea ................................... 62/1 |
| 2,544,476 | 3/1951 | Venning ...................... 137/199 X |
| 2,562,353 | 7/1951 | Gardiner . |
| 2,595,222 | 6/1952 | Bayuk et al. .................. 137/183 |
| 2,635,620 | 4/1953 | Deardorff ...................... 137/197 |
| 2,664,109 | 12/1953 | Iager ................................ 138/42 |
| 2,684,684 | 7/1954 | Stevenson ..................... 137/199 |
| 2,729,228 | 1/1956 | Stevenson ..................... 137/199 |
| 2,908,282 | 10/1959 | Maisch .......................... 137/199 |
| 3,031,845 | 5/1962 | Ludwig ............................ 60/51 |
| 4,383,543 | 5/1983 | Rawlins ........................ 137/78.3 |
| 4,524,793 | 6/1985 | Silverwater ................... 137/198 |
| 4,813,446 | 3/1989 | Silverwater et al. .......... 137/198 |
| 5,211,200 | 5/1993 | Cassidy ......................... 137/199 |

FOREIGN PATENT DOCUMENTS

| | | |
|---|---|---|
| 0232713 | 8/1987 | European Pat. Off. . |
| 1901776 | 8/1970 | Fed. Rep. of Germany . |
| 34-6175 | 4/1959 | Japan . |
| 47-7662 | 3/1972 | Japan . |
| 951761 | 3/1965 | United Kingdom . |
| 1599861 | 10/1981 | United Kingdom . |
| 2094511 | 9/1982 | United Kingdom . |
| 2203520 | 10/1988 | United Kingdom . |

Primary Examiner—Robert G. Nilson
Attorney, Agent, or Firm—Leydig, Voit & Mayer

[57] ABSTRACT

An automatic bleed valve for bleeding air from a pressurized liquid reservoir includes a piston in a position piston chamber located in a flow channel leading from the reservoir. A first orifice is provided in a passage through the piston, and the piston is urged upstream by a resilient spring. A second orifice is located in the flow channel. When gas is expelled from the reservoir, the resilient spring will retain the piston in an equilibrium region, allowing the gas to be bled from the reservoir through the flow channel. When liquid begins to flow through the flow channel, the pressure differential over the piston increases, causing the piston to move against a seat of a poppet and seal off the flow channel and the hydraulic reservoir.

11 Claims, 4 Drawing Sheets

AUTOMATIC PRESSURIZED RESERVOIR BLEED VALVE

TECHNICAL FIELD

The present invention relates to bleed valves in pressurized hydraulic and pneumatic systems. Most particularly, it relates to a bleed valve for removing air from a pressurized hydraulic fluid reservoir.

BACKGROUND ART

Bleed valves of various types have been placed in reservoirs and fluid return lines of hydraulic systems. These values serve to differentiate between fluid in gaseous form and fluid in liquid form and vent, or bleed, either the gaseous or liquid form. Many of these valves have been large and often have been manually operated. Compact, automatic bleed valves for such systems have been described in U.S. Pat. Nos. 4,524,793 and 4,813,446 to Silverwater, and copending U.S. application Ser. No. 07/887,836, all assigned to the assignee of the present application.

A general theory of operation of these automatic bleed valves is explained in the '793 patent. A capillary and orifice placed in series in a fluid channel to cause the pressure distribution along the channel between a high pressure point at the reservoir end of the valve and a low pressure point at the discharge end of the valve to vary depending upon the phase of the fluids flowing in the channel. This theory is based upon the known fact that, in such an arrangement, a steeper pressure gradient will occur over the orifice in the case of gaseous phase flow and, conversely, a steeper gradient will be observed over the capillary portion of such a channel during liquid phase flow. The variation in the pressure distribution in the channel may be utilized to control the opening and closing of a differentiating valve, depending upon the phase of flow through the valve. The preferred embodiment disclosed in the '793 patent is automatic and, thus, mitigates the need for constant operator vigilance.

Thus, each of the aforementioned bleed valves utilizes a series connection of a capillary and an orifice and depends on the fact that a different pressure drop across the capillary occurs when the fluid is flowing in a gas as opposed to a liquid phase. The pressure drop across the capillary is related to the viscosity of the fluid flowing through the capillary and both the spring tension and the capillary size must be adjusted to the particular fluid viscosity.

Many liquids used in hydraulic applications (such as oil) have a viscosity that varies greatly with temperature. Because the design of these conventional bleed valves must be directed to a particular viscosity, they may not work as reliably in environments in which wide temperature variations result in changes in the viscosity of the fluid flowing through the bleed valve. Consequently, this problem is particularly acute when the device is utilized in an environment with very wide temperature swings such as in aerospace applications.

Conventional bleed valves are also difficult to miniaturize and manufacture because of the length and diameter of the capillary.

DISCLOSURE OF THE INVENTION

Accordingly, the present invention provides an automatic bleed valve comprising a housing and a piston. The housing has an inlet passage and an outlet passage and defines a piston chamber. The piston chamber has an upstream end connected to the inlet passage and a downstream end connected to the outlet passage. The piston is located within the piston chamber and divides the chamber into an upstream fluid space communicating with the inlet passage and a downstream fluid space communicating with the outlet passage. The piston has a fluid passage providing fluid communication between the upstream fluid space and the downstream fluid space and includes a first orifice located in the fluid passage in the piston. The automatic bleed valve further comprises a mechanism, such as a spring, which urges the piston in an upstream direction and a second orifice located in the outlet passage. The first and second orifices providing means for restricting gas flow through the fluid passage respectively creating first and second pressure drops.

The present invention also provides an automatic bleed valve comprising a fluid channel and a controller. The fluid channel includes a first restricting orifice and a second restricting orifice and defines fluid communication from a reservoir through the first restricting orifice and the second restricting orifice in series. The controller is coupled to the fluid flow channel to detect changes in a differential pressure across at least one of the first and second restricting orifices and to seal off fluid flow through the fluid channel in response to the differential pressure reaching a predetermined level. The first and second orifices providing means for restricting gas flow through the fluid passage respectively creating first and second pressure drops.

In a preferred mode of operation, the inlet of the automatic bleed valve may be connected to the reservoir at a high point where gas to be expelled will accumulate above the liquid in the reservoir. The gas communicates with the upstream end of the piston via the inlet of the automatic bleed valve. When the system is activated the pressure of the gas in the reservoir increases and urges the piston toward the downstream end of the piston chamber. The gas to be expelled will flow through the first orifice in the piston and through the second orifice and may be vented to the ambient environment. A small pressure drop will be produced by the gas flowing through the first orifice within the piston. When all of the gas is expelled and liquid begins to flow through the valve, a much larger pressure drop is produced by the liquid flowing through the first orifice. This larger pressure drop causes the piston to move further toward the downstream end of the chamber and seal off liquid flow through the channel.

Embodiments of the present invention thus use an entirely different mechanism from conventional automatic bleed valves which used a series connection of a capillary and an orifice. The present invention is predicated on the discovery that two orifices in series are superior to a capillary and orifice in series. In embodiments of the present invention, a differentiating piston with a passage including a first orifice is utilized as a controller in series with a second orifice to accomplish the bleeding process. An automatic bleed valve embodying the present invention thus has the advantage that the pressure drop across the first orifice is independent of the viscosity of the fluid, and therefore, independent of temperature. Therefore, unlike the conventional automatic bleed valves, embodiments of the present invention are independent of fluid viscosity and temperature.

Embodiments of the present invention have numerous additional advantages over conventional automatic bleed valves. For example, automatic bleed valves embodying the present invention are more easily manufacturable and more capable of being miniaturized. They have a minimum of seals and moving parts, thus reducing the possibility of mechanical failure and minimizing problems which may be caused by dirt or highly viscous contaminants present in the system.

BRIEF DESCRIPTION OF THE DRAWINGS

FIG. 6A is a sectional view along line A—A of the poppet of FIG. 6B;

BEST MODE FOR CARRYING OUT THE INVENTION

Figure 1:
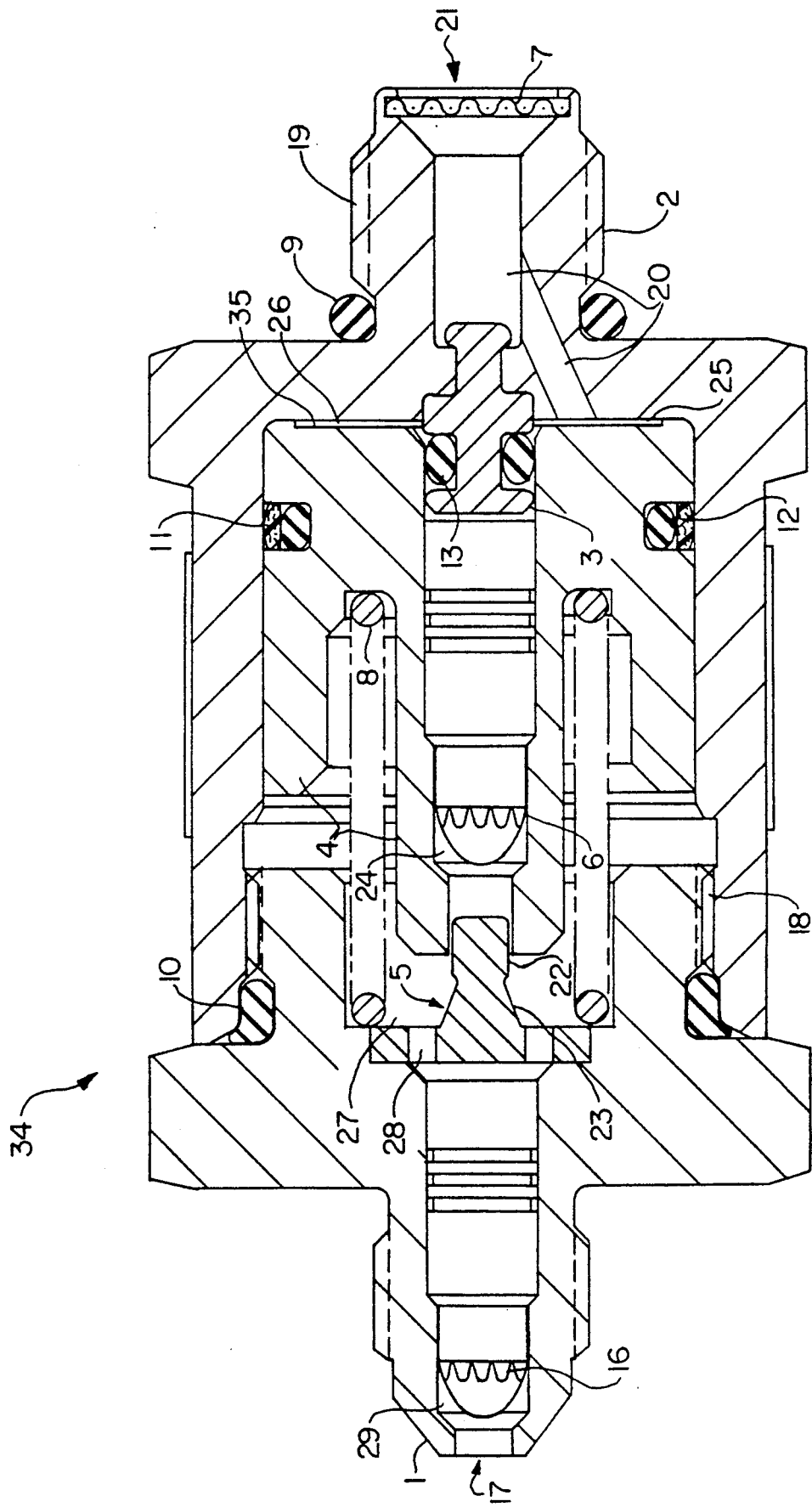
FIG. 1 is a sectional view of an automatic bleed valve embodying of the present invention.
Figure 2:
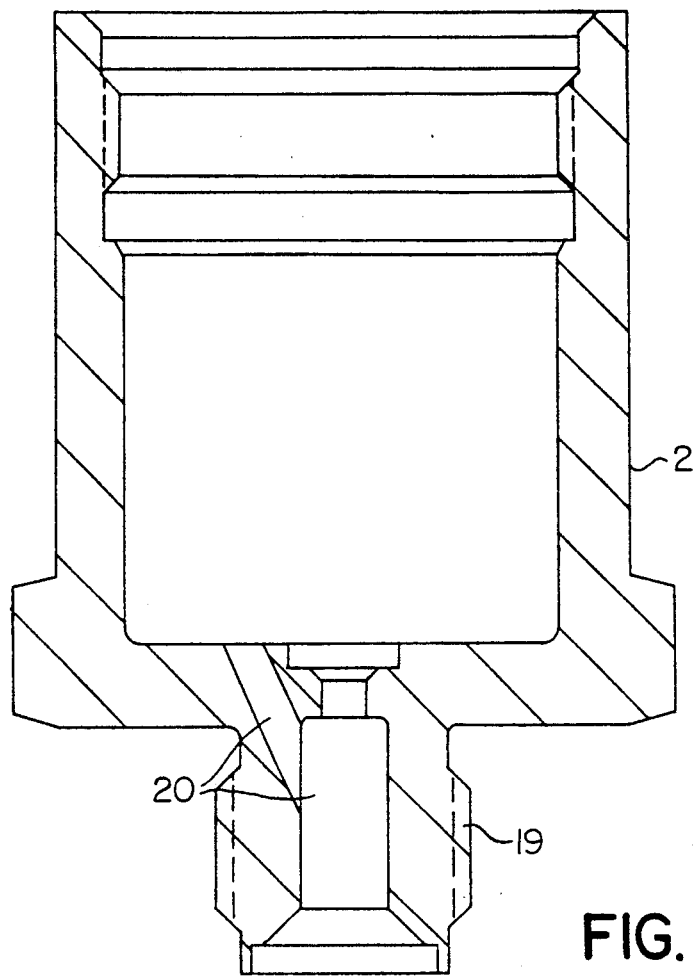
FIG. 2 is a sectional view of the lower valve housing of the bleed valve of FIG. 1.

An exemplary automatic bleed valve embodying the present invention generally comprises a housing and a piston slidably positioned in the housing. The housing may be configured in a variety of ways. For example, in the embodiment illustrated in FIG. 1, the housing comprises two pieces, a first housing piece 2 and a second housing piece 1. The first housing piece 2 has an inlet 21, inlet housing threads 19, and a boss seal 9, as shown in FIGS. 1 and 2. A filter 7 is preferably disposed in the inlet 21.

A piston chamber 25 is formed by inner walls of the first housing piece 2, and an inlet passage 20 provides fluid communication between the inlet 21 and the piston chamber 25. An O-ring carrier 3 is preferably mounted to the first housing piece 2 and extends into the piston chamber 25. An O-ring 13 is mounted on the O-ring carrier 3.

Figure 3:
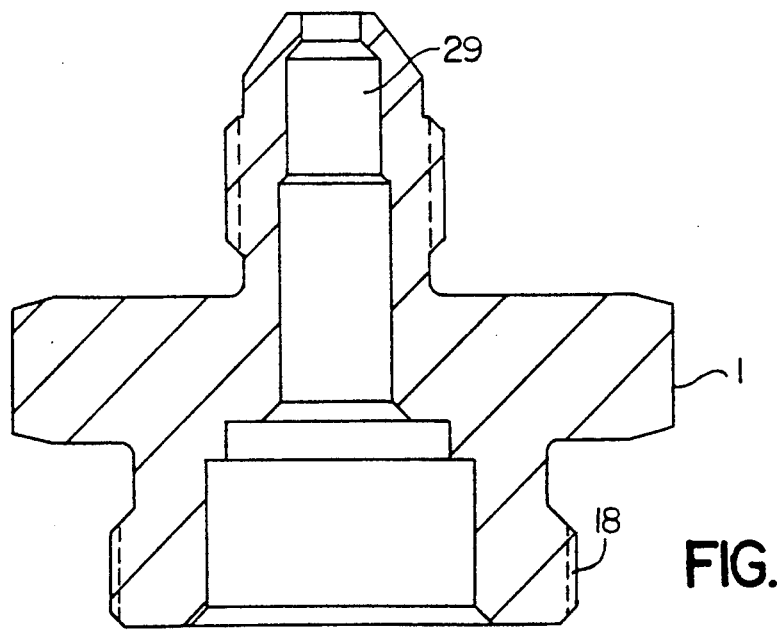
FIG. 3 is a sectional view of the upper valve housing of the bleed valve of FIG. 1.
Figure 4A:
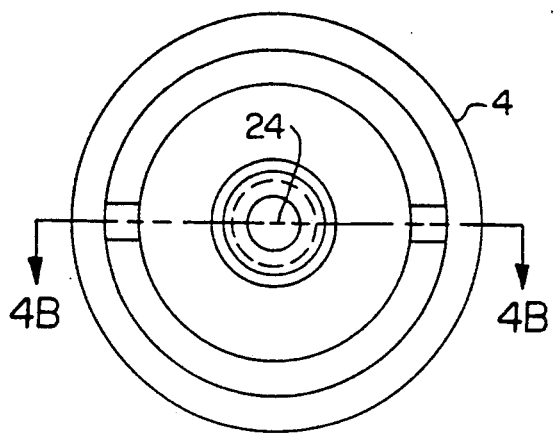
FIG. 4A is a top view of the piston of the bleed valve of FIG. 1.

The second housing piece 1 has an outlet 17 and an outlet passage 29 as shown in FIGS. 1 and 3. The second housing piece 1 may be removably or permanently attached to the first housing piece 2 in any suitable manner, including, for example, by mating threads 18. A valve housing O-ring seal 10 may be disposed between the first and second housing pieces 1, 2 to prevent the leakage of fluid from the piston chamber 25.

The piston 4 is slidably engaged with the inner walls of the housing in the piston chamber 25 and divides the piston chamber into an upstream fluid space 26 and a downstream fluid space 27. The outer wall of the piston is preferably sealed to the inner wall of the housing in any suitable manner to prevent fluid from bypassing the piston. For example, a piston O-ring 12 and a grid-ring or cap strip 11 formed, for example, from Teflon may be provided in a groove in the piston outer wall.

In the exemplary embodiment, the piston chamber 25 and the piston 4 are cylindrical but could be made in any convenient cross sectional shape, for example, octagonal. The piston 4 may have, for example, a 0.75 inch diameter. The piston further includes a fluid passage communicating between the upstream and downstream fluid spaces 26, 27. The fluid passage may be variously configured and in the exemplary embodiment comprises a central opening 24 axially aligned with the piston 4. The piston passage 24 near the upstream end of the piston is large enough to accept the O-ring carrier 3 and the O-ring 13. While the tolerances between the O-ring carrier 3 and the piston wall defining the central opening 24 are large enough to allow fluid to flow between them, the O-ring 13 in the O-ring carrier 3 is squeezed between the piston 4 and the O-ring carrier 3 such that fluid flow through the central opening, 24 of the piston 4 is blocked. A recess in an upstream end 35 of the piston 4 communicates with the inlet 21 via the inlet passage 20.

Figure 5A:
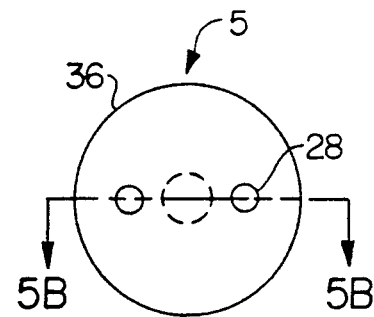
FIG. 5A is a top view of the poppet of FIG. 1.
Figure 5B:
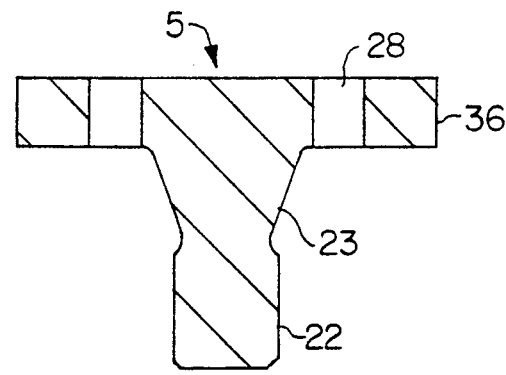
FIG. 5B is a sectional view along line 5B—5B of the poppet of FIG. 5A.
Figure 4B:
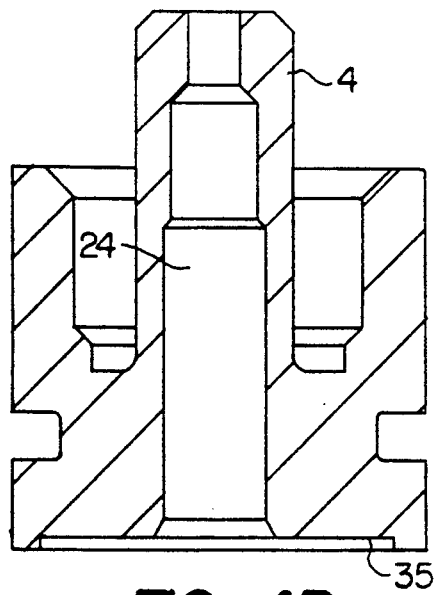
FIG. 4B is a sectional view along line 4B—4B of the piston of FIG. 4A.

A poppet 5, shown in FIGS. 1, 5A and 5B, is fixedly disposed in the downstream fluid space 27 and preferably includes an end portion 22 axially aligned with and disposed within the piston passage 24 through the piston 4. There is a loose tolerance between the end portion 22 of the poppet and the inner wall of the piston so as not to impede fluid flow from the piston passage 24 to the downstream fluid space 27. The poppet 5 also includes a flange 36 having outlet openings 28 to allow fluid to pass from the downstream fluid space 27 to the outlet passage 29. Between the poppet end portion 22 and the flange is a seat 23 which is preferably conically shaped and is sized to seal the downstream end of the piston passage 24. As the piston 4 slides towards the outlet 17, the piston 4 seats on the seat 23 of the poppet 5 so that no fluid will pass from the piston passage 24 into the downstream fluid space 27.

The automatic bleed valve further includes a means for urging the piston toward the upstream end of the housing. This means is preferably a spring 8 and may be located in a variety of positions within the housing. For example, in the illustrated embodiment, the spring 8 is disposed in the downstream fluid space 27 between the second housing piece 1 and the piston 4. The spring 8 is preferably a helical compression spring. A spring constant of the spring 8 may be selected based on such factors as the reservoir pressure and the piston configuration. In a preferred embodiment, the spring force is set so that it requires approximately 12 pounds of force to move the piston 4 against the spring bias such that the piston 4 becomes seated against the seat 23 of the poppet 5. This is a significant advantage over conventional bleed valves which are designed to operate at a spring force of only about 1 pound of force.

Figure 6A:
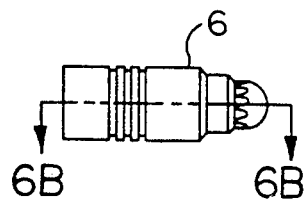
FIG. 6A is a top view of the orifice of FIG. 1.
Figure 7B:
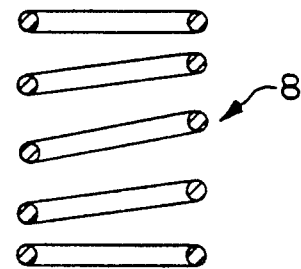
FIG. 7B is a sectional view along line 7B—7B of the spring of FIG. 7A.
Figure 6B:
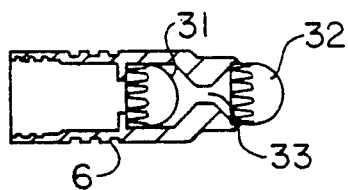
Figure 7A:
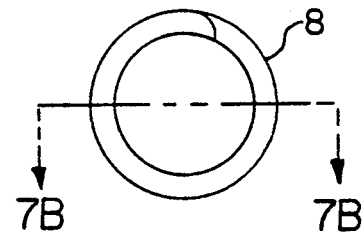
FIG. 7A is a top view of the spring of FIG. 1.

In accordance with an important aspect of the invention, the fluid channel through the automatic bleed valve 34 includes two orifices 6, 16 in series. The first orifice is preferably located in the piston 4 and the second orifice 16 is preferably located downstream from the piston 4. For example, in the illustrated embodiment, the first orifice 6 is located in the piston passage 24 and the second orifice 16 is located in the outlet passage 29, as shown in FIG. 1. Each orifice 6, 16 may be configured in a variety of suitable ways. In a preferred embodiment, each orifice 6, 16 comprises a Lee Jet available from Lee Company in Westbrook, Conn. As shown in FIGS. 6A and 6B, each orifice 6, 16 includes a generally cylindrical, hollow casing having a restricted opening 33 which defines the orifice between first and second filters 31, 32. In the illustrated embodiment, the restricted openings in both orifices 6, 16 have the same diameter. For example, each opening may be about 0.004 inch in order to limit the flow of oil to about 1500 cc per hour in the event of failure of the O-ring seals. Alternatively, the restricted openings of the orifices 6, 16 may be larger or smaller than 0.004 inch and may have different diameters. The orifices 6, 16 are preferably press fit within the piston passage 24 and the outlet passage 29, respectively. An interference fit between the piston 4 and the first orifice 6 and between the first housing piece 1 and the second orifice 16 seals the orifices 6, 16 within the fluid channel and prevents bypass of fluid around the orifices 6, 16.

In a preferred mode of operation, the automatic reservoir bleed valve 34 may be threaded to the reservoir (not shown) at the inlet 21. Using inlet housing threads 19. The boss seal 9 then seals the automatic bleed valve 34 to the reservoir. The automatic bleed valve 34 is preferably coupled to the highest point in the reservoir where the gaseous phase of the fluid contained in the reservoir is likely to collect. Before the reservoir is pressurized, the spring 8 forces the upstream end 35 of the piston 4 against the first housing piece 2. In this position, the O-ring 13 is located within and seals the piston passage 24. Thus, this arrangement of the O-ring 13 and the O-ring carrier 3 serves as a check valve preventing fluid flow from the ambient environment into the reservoir. Alternatively, this check valve function may be implemented in other suitable ways.

When the system, e.g., the hydraulic system, is activated, the pressure in the reservoir builds up. As the pressure increases, gas flows out of the pressurized reservoir, into the inlet 21, through the filter 7, and into the inlet passage 20 and the upstream fluid space 26 of the piston chamber 25. The fluid is prevented from entering the piston passage 24 by the O-ring 13 in the piston passage 24. As the pressure further increases, a sufficient force is exerted on the piston 4 to move the piston 4 against the force of the spring 8 toward the downstream fluid space 27. At a predetermined threshold pressure, the piston 4 moves far enough that the O-ring 13 clears the piston 4 and fluid flow through the piston passage 24 is established. For an outlet at atmospheric pressure, the piston 4 and spring 8 may be configured such that the O-ring 13 clears the piston 4 once the pressure in the reservoir is between about 25 and about 45 psi.

From the upstream fluid space 26, the fluid flow path extends through the piston passage 24, through the orifice 6 and into the downstream fluid space 27. From the downstream fluid space 27, the fluid flows through the outlet openings 28, through second orifice 16 in the outlet passage 29, and out of the outlet 17.

As the fluid enters the downstream fluid space 27, a back pressure is created which tends to force the piston 4 back towards the upstream side. The tension of the spring 8 is set such that, when the fluid is in the gaseous phase, the piston stays in an equilibrium region in which the O-ring 13 clears the piston 4 but the piston 4 is not seated on the seat 23 of the poppet 5, allowing the gas to flow through the fluid channel to the outlet 17. This equilibrium position may be determined in accordance with an equilibrium equation which can be expressed as:

$$P_1 * A_1 = (P_2 * A_2) + \text{Spring Force}$$

where
P1 = Pressure in the upstream fluid space
P2 = Pressure in the downstream fluid space
A1 = Upstream Piston Area
A2 = Downstream Piston Area Although the theory of operation may not be completely understood, it appears that when two orifices of equal size are placed in series and a gas is passed through them, the pressure drop across the first orifice 6 may be less than the pressure drop across the second orifice 6. For example, 20% of the inlet pressure may drop across the first orifice 6 and 80% of the pressure may drop across the second orifice 16 when the fluid is in the gaseous phase. However, when a liquid is passed through the two orifices 16, 6 in series, the pressure drops may be approximately equal. This phenomenon can be utilized to allow for the automatic operation of a bleed valve according to the present invention.

As an example of one embodiment, it is useful to examine the situation where the above mentioned equilibrium is established when the fluid flowing through the piston passage is in the gaseous phase. So long as a gaseous fluid is flowing through the fluid channel, the piston 4 will stay in the equilibrium region. However, once all of the gas has been bled from the reservoir and fluid in the liquid phase enters the piston passage 24 and passes through the first orifice 6, the pressure drop across the first orifice 6 will increase. This increase in pressure drop across the first orifice 6 causes the piston 4 to move against the force of the spring 8 onto the seat 23 of the poppet 5, sealing the fluid channel through the automatic bleed valve 34 and preventing escape of any substantial amount of liquid. The pressure in the downstream fluid space 27 dissipates through the second orifice 16 and the outlet 17, resulting in the elimination of any significant back pressure on the piston 4. Thus, the piston 4 will be firmly seated on the seat 23 of the poppet 5 until the hydraulic pump is turned off. Turning off the hydraulic pump reduces the reservoir pressure, allowing the spring 8 to return the upstream end 35 of the piston 4 to the biased upstream position against the first housing piece 2.

It is possible to calculate preferred orifice sizes for various reservoir pressures using conventional equations, such as Bernoulli's equation, for either a liquid flow or a gas flow. The use of these equations to calculate the change in pressure through a single orifice or through two orifices connected in series is well known. As previously mentioned, the equation for calculating the pressure drop across an orifice does not include the viscosity of the fluid as one of the variables. The flow rate through the first orifice 6 can be calculated as $\Delta P = P_1 - P_2$. The $\Delta P$ through the inlet orifice 16 equals $P_2 - 14.7$ (atmospheric reference pressure at outlet). Inserting a conventional equation for gas flow through an orifice into the above mentioned formula, and solving the formula in terms of P1 yields the following result:

$$P_1 = P_2 * \left(\frac{d_2^2}{d_1^2}\right) * \frac{\sqrt{3.5\left[\left(\frac{14.7}{P_2}\right)^{1.429} - \left(\frac{14.7}{P_2}\right)^{1.714}\right]}}{\sqrt{3.5\left[\left(\frac{P_2}{P_1}\right)^{1.429} - \left(\frac{P_2}{P_1}\right)^{1.714}\right]}}$$

Inserting a conventional equation for liquid flow through an orifice into the above mentioned formula, and solving the formula in terms of P2 yields the following result:

$$P_2 = \frac{P_1 + 14.7\left(\frac{d_2}{d_1}\right)^4}{\left(\frac{d_2}{d_1}\right)^4 + 1}$$

DEFINITION OF TERMS $P_1$ = Pressure in psia, Upstream of the first orifice
$P_2$ = Pressure in psia, Downstream of the first orifice
14.7 psia = Atmospheric Reference Pressure Downstream of the Second Orifice
$d_1$ = Diameter of the first orifice, in inches
$d_2$ = Diameter of the first orifice, in inches Employing the above mentioned equations, it is possible to calculate preferred ratios between the sizes of the first and second orifices 6, 16 for various reservoir pressures so as to achieve the maximum pressure differential between a fluid flow in the liquid phase and the gas phase, at P2 (i.e. maximum difference value). An first-orifice-to-second-orifice ratio having a deviation from the ratio at the maximum difference pressure value of about 20% to about 40% is expected to still provide adequate results in most applications. For example, at 100 psi, a preferred ratio between the sizes of the second orifice 16 and the first orifice 6 is 1.183. However, embodiments of the present invention will operate over a variation of plus or minus 0-40% of this value. It is preferred to maintain the variation within 0-20%.

Table 1 provides sample calculations for various reservoir pressures P1. The maximum difference of pressure drops for liquid phase fluids verses gaseous phase fluids is shown in the column labeled MDIFF. The column D2/D1 provides the second orifice diameter (D2) to the first orifice diameter (D1) ratio for the orifices at the point where the maximum difference of the pressures drop across the first orifice 6 between liquid and gas flows is reached.

TABLE 1

| P1 | Pressure in psia, upstream of the first orifice; |
| MDIFF | Max difference in pressure drops for liquid and gaseous flows; |
| D2/D1 | Ratio of Orifice diameters |
| RATIO | square of D2/D1; |

| P1 | MDIFF | RATIO | D2/D1 |
|---|---|---|---|
| 50.00 | 9.11 | 1.060 | 1.030 |
| 60.00 | 13.83 | 1.140 | 1.068 |
| 70.00 | 19.12 | 1.220 | 1.105 |
| 80.00 | 24.87 | 1.280 | 1.131 |
| 90.00 | 31.00 | 1.340 | 1.158 |
| 100.00 | 37.00 | 1.400 | 1.183 |
| 110.00 | 44.15 | 1.460 | 1.208 |
| 120.00 | 51.08 | 1.510 | 1.229 |
| 130.00 | 58.21 | 1.560 | 1.249 |
| 140.00 | 65.50 | 1.610 | 1.269 |
| 150.00 | 72.95 | 1.650 | 1.285 |
| 160.00 | 80.53 | 1.690 | 1.300 |
| 170.00 | 88.23 | 1.740 | 1.319 |
| 180.00 | 96.03 | 1.780 | 1.334 |
| 190.00 | 103.93 | 1.810 | 1.345 |
| 200.00 | 111.92 | 1.850 | 1.360 |
| 210.00 | 119.99 | 1.890 | 1.375 |
| 220.00 | 128.13 | 1.920 | 1.386 |
| 230.00 | 136.34 | 1.960 | 1.400 |
| 240.00 | 144.61 | 1.990 | 1.411 |
| 250.00 | 152.94 | 2.020 | 1.421 |

While an exemplary reservoir bleed valve embodying the present invention has been shown, it will be understood, of course, that the invention is not limited to that embodiment. Modification may be made by those skilled in the art, particularly in light of the foregoing teachings. It is, therefore, intended that the appended claims cover any such modifications which incorporate the features of this invention or encompass the true spirit and scope of the invention.

I claim:

1. An automatic bleed valve for a pressurized fluid reservoir comprising:
    a housing including an inlet passage and an outlet passage and defining a piston chamber having an upstream end connected to the inlet passage and a downstream end connected to the outlet passage;
    a piston located within the piston chamber and dividing the chamber into an upstream fluid space communicating with the inlet passage and a downstream fluid space communicating with the outlet passage, the piston having a fluid passage providing fluid communication between the upstream fluid space and the downstream fluid space and including a first orifice means disposed in the fluid passage for restricting gas flow through the passage and thereby developing a first pressure drop;
    means for urging the piston in an upstream direction; and
    a second orifice means located in the outlet passage for restricting gas flow through the passage and thereby developing a second pressure drop.

2. A bleed valve according to claim 1, including a check valve located in the fluid passage of the piston allowing fluid to flow through the outlet passage only in one direction and only in response to a reservoir pressure greater than a predetermined pressure.

3. A bleed valve according to claim 2 in which a seal is provided between an outer wall of the piston and an inner wall of the piston chamber by a piston seal O-ring and a cap-strip.

4. The automatic bleed valve as recited in claim 1 wherein the second orifice provides a back pressure for urging the piston in an upstream direction.

5. The automatic bleed valve as recited in claim 4 wherein the back pressure is eliminated whenever the upstream fluid space is not in fluid communication with the down stream fluid space.

6. A bleed valve according to claim 4 in which a seal is provided between an outer wall of the piston and an inner wall of the piston chamber.

7. A bleed valve according to claim 1 comprising:
    a first seal disposed in an downstream portion of the piston chamber around the outlet passage, for sealing the fluid passage and interrupting fluid communication between the upstream fluid space and the downstream fluid space;
    a check valve located in the fluid passage of the piston allowing fluid to flow through the outlet passage only in one direction and only in response to a reservoir pressure greater than a predetermined pressure.

8. An automatic bleed valve for a pressurized fluid reservoir comprising:
- a fluid channel including a first orifice means for restricting gas flow through the passage and thereby developing a first pressure drop and a second orifice means for restricting gas flow through the passage and thereby developing a second pressure drop and defining fluid communication from the reservoir through the first restricting orifice means and the second restricting orifice means in series; and
- a controller coupled to the fluid flow channel to detect changes in a differential pressure due to changes in a fluid phase across at least one of the first restricting orifice and the second restricting orifice and to seal off the fluid flow through the fluid channel in response to the differential pressure reaching a predetermined level.

9. An automatic bleed valve according to claim 8, wherein the fluid channel includes a piston chamber within said fluid channel having interior walls, an axis, and upstream and downstream ends;
- wherein the controller includes a piston contained within the piston chamber and having an exterior wall in slidable contact with the interior walls of said piston chamber and an axis coinciding with the axis of said piston chamber, said piston having an upstream end and a downstream end, wherein the first restricting orifice is positioned for providing fluid communication between the upstream end and the downstream end of the piston, and wherein fluid flow through the fluid channel is sealed off when the piston is moved toward the downstream end in response to the differential pressure reaching the predetermined level between the upstream and downstream ends of said piston, and wherein the control means includes a biasing means to urge said piston towards the upstream end of said piston chamber.

10. A bleed valve according to claim 9, wherein the first restricting orifice is contained within the piston.

11. An automatic bleed valve for a pressurized (P1) fluid reservoir comprising:
- a fluid channel including,
  - an outlet, a first restricting orifice and a second restricting orifice, and
  - defining fluid communication in series from the reservoir through the first restricting orifice and the second restricting orifice to the outlet, wherein the outlet is at a lower pressure than the reservoir, wherein the pressure between the first restricting orifice and the second restricting orifice is P2, and wherein the ratio of a diameter of the first restricting orifice to a diameter of the second restricting orifice is substantially the ratio that achieves the maximum difference in value of P2 between a fluid in a gaseous phase and the fluid in a liquid phase;
- a controller coupled to the fluid flow channel to detect changes in a differential pressure across at least one of the first restricting orifice and the second restricting orifice, and to seal off the fluid flow through the fluid channel in response to the differential pressure reaching a predetermined level.

* * * * *